United States Patent
Ko et al.

(10) Patent No.: US 8,619,699 B2
(45) Date of Patent: Dec. 31, 2013

(54) CHANNEL SWITCHING APPARATUS AND METHOD OF A BASE STATION AND CHANNEL SWITCHING APPARATUS AND METHOD OF A TERMINAL BASED ON THE COGNITIVE RADIO SYSTEM

(75) Inventors: Gwangzeen Ko, Seoul (KR); Sung-Jin You, Daejeon (KR); Myung-Sun Song, Daejeon (KR); Sung-Hyun Hwang, Daejeon (KR); Jung-Sun Um, Suwon (KR); Chang-Joo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 390 days.

(21) Appl. No.: 12/808,507

(22) PCT Filed: Dec. 5, 2008

(86) PCT No.: PCT/KR2008/007190
§ 371 (c)(1),
(2), (4) Date: Jun. 16, 2010

(87) PCT Pub. No.: WO2009/078606
PCT Pub. Date: Jun. 25, 2009

(65) Prior Publication Data
US 2010/0290416 A1 Nov. 18, 2010

(30) Foreign Application Priority Data
Dec. 17, 2007 (KR) .................. 10-2007-0132726

(51) Int. Cl.
*H04W 4/00* (2009.01)
(52) U.S. Cl.
USPC ..................... 370/330; 370/329; 370/437
(58) Field of Classification Search
None
See application file for complete search history.

(56) References Cited

U.S. PATENT DOCUMENTS

| 7,486,616 | B2 * | 2/2009 | Kitchin ..................... 370/228 |
| 7,545,308 | B2 * | 6/2009 | Mitsugi ..................... 342/52 |
| 8,179,797 | B2 * | 5/2012 | Chandra et al. ............ 370/231 |
| 8,233,908 | B2 * | 7/2012 | Cho et al. .................. 455/450 |
| 2004/0151137 | A1 * | 8/2004 | McFarland et al. ........ 370/329 |
| 2009/0040986 | A1 * | 2/2009 | Cordeiro et al. ........... 370/338 |
| 2010/0271948 | A1 * | 10/2010 | Challapali et al. ........ 370/235 |
| 2011/0243078 | A1 * | 10/2011 | Kim et al. ................. 370/329 |
| 2012/0170534 | A1 * | 7/2012 | Kim et al. ................. 370/329 |

FOREIGN PATENT DOCUMENTS

| KR | 1020070048530 | 5/2007 |
| KR | 1020070048535 | 5/2007 |
| KR | 1020070052229 | 5/2007 |
| WO | 2007/058490 A1 | 5/2007 |
| WO | 2007/094604 A1 | 8/2007 |

\* cited by examiner

*Primary Examiner* — Donald Mills
(74) *Attorney, Agent, or Firm* — Nelson Mullins Riley & Scarborough LLP

(57) ABSTRACT

A channel switching method is provided for a base station to allocate a slot for data exchange with each of a plurality of terminals in a frequency channel that is not used by an incumbent user (IU). The method includes include transmitting a channel switching message for requesting to switch to a backup channel when a signal of the IU is sensed in the frequency channel; transmitting a beacon frame via the backup channel, wherein the beacon frame comprises allocation information about slots which are in the frequency channel and which are respectively allocated to each of the plurality of terminals; and allocating the slot for data exchange with each of the plurality of terminals to the backup channel according to the allocation information, and communicating with each of the plurality of terminals.

24 Claims, 6 Drawing Sheets

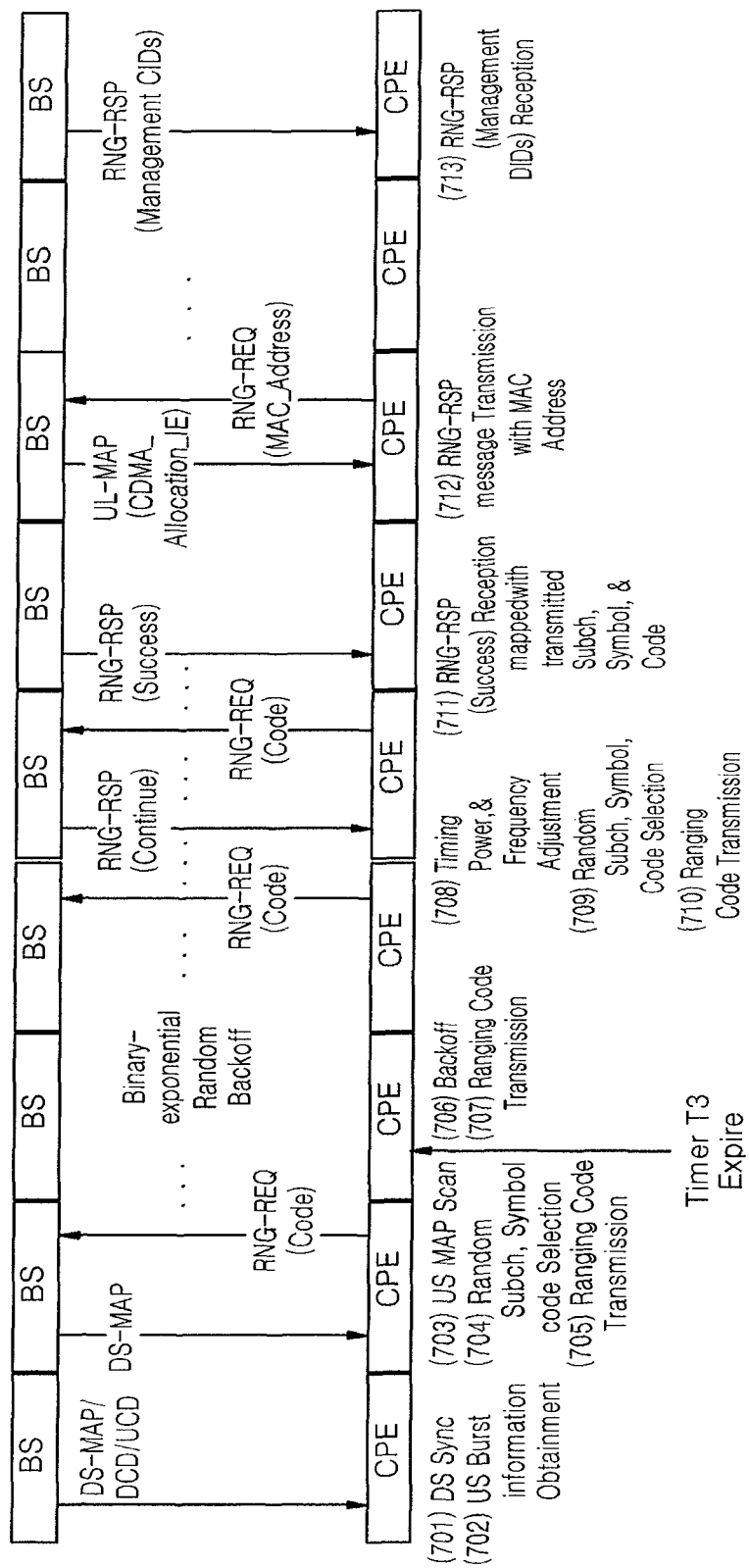

CHANNEL SWITCHING APPARATUS AND METHOD OF A BASE STATION AND CHANNEL SWITCHING APPARATUS AND METHOD OF A TERMINAL BASED ON THE COGNITIVE RADIO SYSTEM

RELATED APPLICATIONS

This application is a 35 U.S.C. §371 national stage filing of PCT Application No. PCT/KR2008/007190 filed on Dec. 5, 2008, which claims priority to, and the benefit of, Korean Patent Application No. 10-2007-0132726 filed on Dec. 17, 2007. The contents of the aforementioned applications are hereby incorporated by reference.

TECHNICAL FIELD

The present invention relates to a channel switching apparatus and method thereof performed by a base station, and a channel switching apparatus and method thereof performed by a terminal so that initialization is rapidly performed in a cognitive radio system, and more particularly, to a channel switching apparatus and method thereof performed by a base station, and a channel switching apparatus and method thereof performed by a terminal so that system reliability is improved and Quality of Service (QoS) is enhanced by reducing an initialization time after channel switching is performed in a cognitive radio system.

The present invention is derived from research which was supported by the 'IT Original Technology Research and Development Program' of the Ministry of Information and Communications (MIC), Republic of Korea [the project management number: 2005-S-002-03, and the project title: 'Development of Cognitive Radio Technology for improving spectrum usage efficiency'.

BACKGROUND ART

Due to recent exhaustion of frequency resources, cognitive radio technology is being continuously developed to satisfy demands of government and industry, which attempt to efficiently use frequency bands.

A licensed user in the existing communication system has a privileged use right to a specific band, and performs communication under that right. Thus, the licensed user can temporally and constantly occupy the specific band, and, in this situation, channel switching is performed in a previously licensed band so that the privileged use right remains guaranteed with respect to a channel to be switched to. Unlike the existing communication system, one or more embodiments of the present invention are related to using cognitive radio technology according to an open spectrum policy in which the privileged use right is not guaranteed. Hereinafter, with respect to cognitive radio systems, for convenience of description, the licensed user is referred to as an 'incumbent user (IU)'.

Cognitive radio technology randomly or periodically scans or senses whether the IU uses a corresponding band, thereby using a band that is currently not used by the IU. Also, the cognitive radio technology periodically scans whether the IU enters the corresponding band during usage of the corresponding band. If the IU enters the corresponding band, the cognitive radio technology discontinues data transmission and reception, switches its communication channel to another band free from the IU, and re-establishes the discontinued data transmission and reception, thereby maintaining communication. That is, a core of the cognitive radio technology is a channel switching procedure in which entrance of the IU is sensed so that communication in a corresponding band is discontinued and a communication channel is switched to another band free from the IU.

In the case of the Institute of Electrical and Electronics Engineers (IEEE) 802.11h standard, the cognitive radio technology is partially used to operate a wireless local area network (WLAN) system in a 5 GHz band in which a radar signal and a satellite signal are Ws. At this time, since the IUs perform transmission to a wider area by using relatively large power, the cognitive radio technology is used in a simple manner. An IEEE 802.22 Wireless Regional Area Network (WRAN) system is considered as an initial standard based on the cognitive radio technology, and is a system that basically operates in an Ultra High Frequency (UHF) band in which a television (TV) signal and a Wireless Micro Phone (WMP) signal are IUs. Standardization work with respect to the IEEE 802.22 WRAN system is currently being conducted and, in regard to initialization after channel switching, an alternative technology is not yet been developed. In the IEEE 802.11h standard, each access point (AP) after channel switching is designed to re-set a channel from the beginning.

In the cognitive radio system, when communication in an operational channel is determined to be discontinued due to the IU entering the operational channel that is currently being used or due to an excessive interference occurring in the operational channel, the operational channel is switched to a pre-arranged channel. However, since some parameters are different between the operational channel and the pre-arranged channel, an initialization procedure has to be performed to allow the cognitive radio system to be adapted to those different parameters. Since an initialization technique aiming for this situation has not been developed yet, a conventional cognitive radio system uses a general initialization technique used to initially operate a system. However, the general initialization technique has to allow the system to be adapted to many parameters so that it takes a relatively long initialization time.

Accordingly, there is a demand for a technology capable of rapidly performing initialization work after channel switching is performed in the cognitive radio system.

DESCRIPTION OF THE DRAWINGS

FIGS. 7A and 7B are diagrams of an initialization procedure when a channel switching apparatus and method thereof are applied to an Institute of Electrical and Electronics Engineers (IEEE) 802.22 system according to another embodiment of the present invention.

DETAILED DESCRIPTION OF THE INVENTION

Technical Problem

Figure 1:
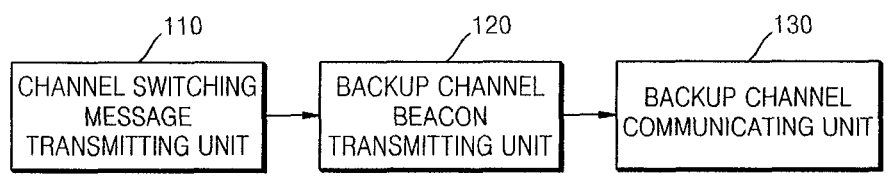
FIG. 1 is a configuration diagram of a channel switching apparatus of a base station in a cognitive radio system according to an embodiment of the present invention.

The present invention provides a channel switching apparatus and method thereof performed by a base station, and a channel switching apparatus and method thereof performed by a terminal so that system reliability is improved and Quality of Service (QoS) is enhanced by reducing an initialization time after channel switching is performed in a cognitive radio system.

Technical Solution

According to an aspect of the present invention, there is provided a channel switching apparatus of a base station in a cognitive radio system, wherein the base station allocates a slot for data exchange with each of a plurality of terminals in a frequency channel which is not used by an incumbent user (IU), and performs communication, the base station including a channel switching message transmitting unit transmitting a channel switching message requesting to switch to a backup channel when a signal of the IU is sensed in the frequency channel; a backup channel beacon transmitting unit transmitting a beacon frame via the backup channel, wherein the beacon frame comprises allocation information about slots which are in the frequency channel and which are respectively allocated to each of the plurality of terminals; and a backup channel communicating unit allocating the slot for data exchange with each of the plurality of terminals to the backup channel according to the allocation information, and communicating with each of the plurality of terminals via the backup channel.

According to another aspect of the present invention, there is provided a channel switching method performed by a base station in a cognitive radio system, wherein the base station allocates a slot for data exchange with each of a plurality of terminals in a frequency channel which is not used by an incumbent user (IU), and performs communication, the channel switching method including the operations of transmitting a channel switching message for requesting to switch to a backup channel when a signal of the IU is sensed in the frequency channel; transmitting a beacon frame via the backup channel, wherein the beacon frame comprises allocation information about slots which are in the frequency channel and which are respectively allocated to each of the plurality of terminals; and allocating the slot for data exchange with each of the plurality of terminals to the backup channel according to the allocation information, and communicating with each of the plurality of terminals via the backup channel.

According to another aspect of the present invention, there is provided a channel switching apparatus of a terminal in a cognitive radio system, wherein the terminal communicates with a base station via an allocated slot in a frequency channel which is not used by an incumbent user (IU), the channel switching apparatus including a beacon frame receiving unit receiving a beacon frame via a backup channel, wherein the beacon frame comprises allocation information about the slot which is in the frequency channel and which is allocated to the terminal, when the beacon frame receiving unit recognizes that the frequency channel is unusable due to the IU; an allocated slot detecting unit extracting the allocation information by decoding the beacon frame, and detecting the slot in the backup channel by using the extracted allocation information, wherein the slot is allocated to the terminal; and a backup channel communicating unit communicating with the base station via the detected slot.

According to another aspect of the present invention, there is provided a channel switching method performed by a terminal in a cognitive radio system, wherein the terminal communicates with a base station via an allocated slot in a frequency channel which is not used by an incumbent user (IU), the channel switching method including the operations of receiving a beacon frame via a backup channel, wherein the beacon frame comprises allocation information about the slot which is in the frequency channel and which is allocated to the terminal, when the beacon frame receiving unit recognizes that the frequency channel is unusable due to the IU; extracting the allocation information by decoding the beacon frame, and detecting the slot in the backup channel by using the extracted allocation information, wherein the slot is allocated to the terminal; and communicating with the base station via the detected slot.

Advantageous Effects

According to one or more embodiments of the present invention, it is possible to improve system reliability, to significantly reduce a service delay time period and to easily satisfy a Quality of Service (QoS) by reducing an initialization time after channel switching is performed in a cognitive radio system.

BEST MODE

Figure 2:
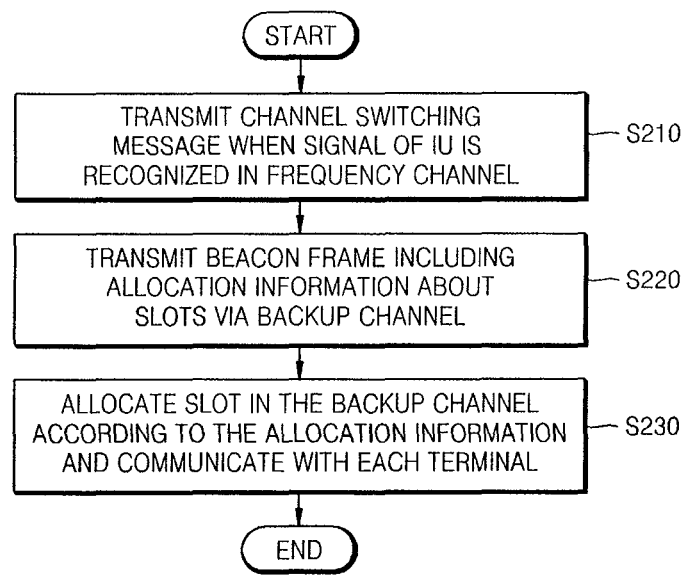
FIG. 2 is a flowchart of a channel switching method performed by the base station of FIG. 1.

FIG. 1 is a configuration diagram of a channel switching apparatus of a base station in a cognitive radio system according to an embodiment of the present invention. FIG. 2 is a flowchart of a channel switching method performed by the base station of FIG. 1.

Concepts in regard to the base station and a terminal may also be respectively applied to a network management system (NMS) and a device in a small network such as an Ad-Hoc network in which a base station and a terminal are changed according to time with respect to their functions and are operated.

Referring to FIG. 1, the channel switching apparatus of the base station includes a channel switching message transmitting unit 110, a backup channel beacon transmitting unit 120, and a backup channel communicating unit 130.

When a signal of an incumbent user (IU) is recognized in a frequency channel that is not being used by the IU, the channel switching message transmitting unit 110 transmits a channel switching message so as to request each of a plurality of terminals to switch their communication channels to a backup channel that is predetermined for each channel (operation S210). At this time, the channel switching message may contain information indicating the predetermined backup channel.

The backup channel beacon transmitting unit 120 transmits a beacon frame via the predetermined backup channel, wherein the beacon frame includes allocation information about slots which are in the frequency channel and which are respectively allocated to each of a plurality of terminals previously (operation S220).

The channel switching apparatus may further include a reception acknowledgement message receiving unit (not shown) that receives a reception acknowledgement message from each terminal, wherein the reception acknowledgement message indicates that the channel switching message is normally received. When the reception acknowledgement message receiving unit receives the channel switching message, or when the reception acknowledgement message receiving unit does not receive the channel switching message during a predetermined wait period, it may be possible to enable the backup channel beacon transmitting unit 120 to transmit the beacon frame via the backup channel.

The backup channel communicating unit 130 allocates the slot, which is for data exchange with each terminal, in the predetermined backup channel for each terminal according to allocation information about a slot in a previous frequency channel, and thus communicates with each terminal (operation S230).

Also, as well as the allocation information, the beacon frame may further include frame information about a data frame exchanged via the previous frequency channel. The frame information about the data frame contains a start position, an end position, a length of a header, a modulation scheme of the header, a channel coding scheme of the header, a coding rate of the header, a repeat count of the header, a length of a data field, a modulation scheme of the data field, a channel coding scheme of the data field, a coding rate of the data field, etc.

In this manner, when the beacon frame includes the frame information about the data frame used in the previous frequency channel, the backup channel communicating unit 130 may encode/decode or modulate/demodulate a data frame by using the frame information included in the beacon frame, and thus may exchange the data frame with each terminal.

Figure 4:
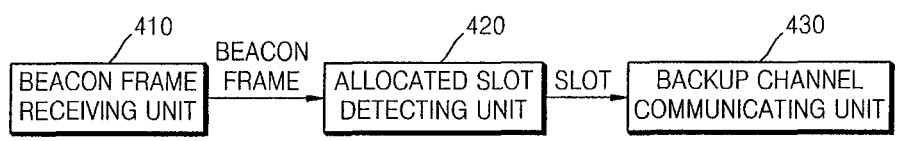
FIG. 4 is a configuration diagram of a channel switching apparatus of a terminal in the cognitive radio system according to another embodiment of the present invention.
Figure 5:
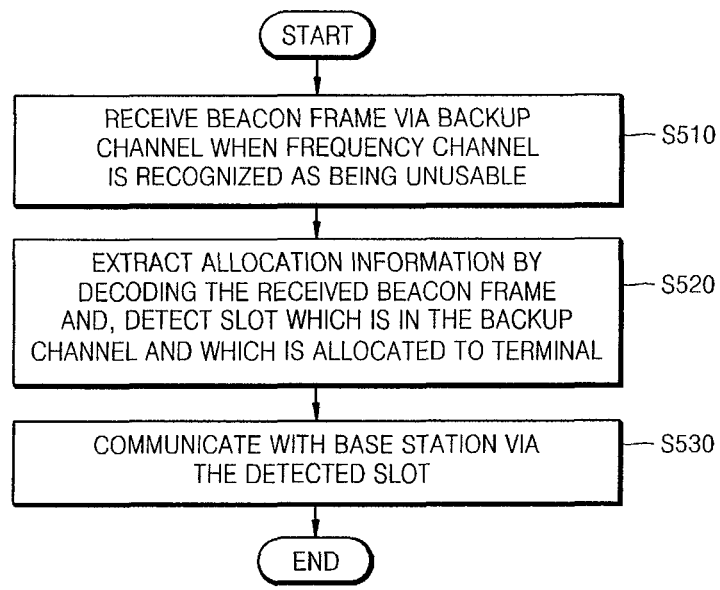
FIG. 5 is a flowchart of a channel switching method performed by the terminal of FIG. 4.

FIG. 4 is a configuration diagram of a channel switching apparatus of a terminal in the cognitive radio system according to another embodiment of the present invention. FIG. 5 is a flowchart of a channel switching method performed by the terminal of FIG. 4.

Referring to FIG. 4, the channel switching apparatus of the terminal includes a beacon frame receiving unit 410, an allocated slot detecting unit 420, and a backup channel communicating unit 430.

When the beacon frame receiving unit 410 recognizes that it is not possible to use a previously used frequency channel due to an IU, the beacon frame receiving unit 410 receives a beacon frame via a backup channel predetermined with a base station, wherein the beacon frame includes allocation information about a slot which is in the previous frequency channel and which is allocated to the terminal (operation S510).

When the beacon frame receiving unit 410 receives a channel switching message from the base station requesting channel switching to the predetermined backup channel, or when the beacon frame receiving unit 410 does not receive a message transmitted from the base station during a predetermined wait period, the beacon frame receiving unit 410 recognizes that it is not possible to use the previous frequency channel due to the IU.

The channel switching apparatus of the terminal may further include a channel switching reception acknowledgement message transmitting unit (not shown) that transmits a reception acknowledgement message indicating normal reception of the channel switching message when the channel switching apparatus of the terminal receives the channel switching message from the base station requesting to switch to the predetermined backup channel.

Here, the allocation information is the same as that described with reference to FIGS. 1 and 2.

The allocated slot detecting unit 420 extracts the allocation information by decoding the beacon frame received by the beacon frame receiving unit 410, and detects the slot in the backup channel by using the extracted allocation information, wherein the slot is allocated to the terminal (operation S520).

In the case where the decoding of the beacon frame fails, the allocated slot detecting unit 420 performs synchronization and ranging via message exchange with the base station and thus, allocates the slot in the backup channel, thereby delivering the detected slot to the backup channel communicating unit 430.

The allocated slot detecting unit 420 may further include a beacon reception acknowledgement message transmitting unit (not shown) that transmits a reception acknowledgement message to the base station so as to indicate that the decoding of the beacon frame is successful.

The backup channel communicating unit 430 communicates with the base station via the slot detected by the allocated slot detecting unit 420 (operation S530).

As previously described with reference to FIGS. 1 and 2, as well as the allocation information, the beacon frame may further include frame information about a data frame exchanged via the previous frequency channel. The frame information about the data frame contains a start position, an end position, a length of a header, a modulation scheme of the header, a channel coding scheme of the header, a coding rate of the header, a repeat count of the header, a length of a data field, a modulation scheme of the data field, a channel coding scheme of the data field, a coding rate of the data field, etc.

In this manner, when the beacon frame includes the frame information about the data frame used in the previous frequency channel, the backup channel communicating unit 430 may encode/decode or modulate/demodulate a data frame by using the frame information included in the beacon frame, and thus may exchange the data frame with the base station.

MODE OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Functions of various devices that are illustrated in drawings including a function block denoted as a processor or as a similar concept to the processor, can be provided not only with specific hardware but also general hardware in which related software may be executed. When these functions are provided by the processor, the functions may be provided by a single specific processor, a single sharable processor, or plural processors in which sharing between the plural processors is possible. Also, usage of terms such as processor, control, or the like should not be construed as being limited to hardware capable of executing software but should be construed as indirectly including digital signal processor (DSP) hardware, read-only memory (ROM), random-access memory (RAM), and non-volatile memory used for storing software. Other well-known conventional hardware devices may be included.

Hereinafter, the present invention will be described in detail by explaining exemplary embodiments of the invention with reference to the attached drawings. In the following description, well-known functions or constructions are not described in detail since they would obscure the invention with unnecessary detail.

Figure 3:
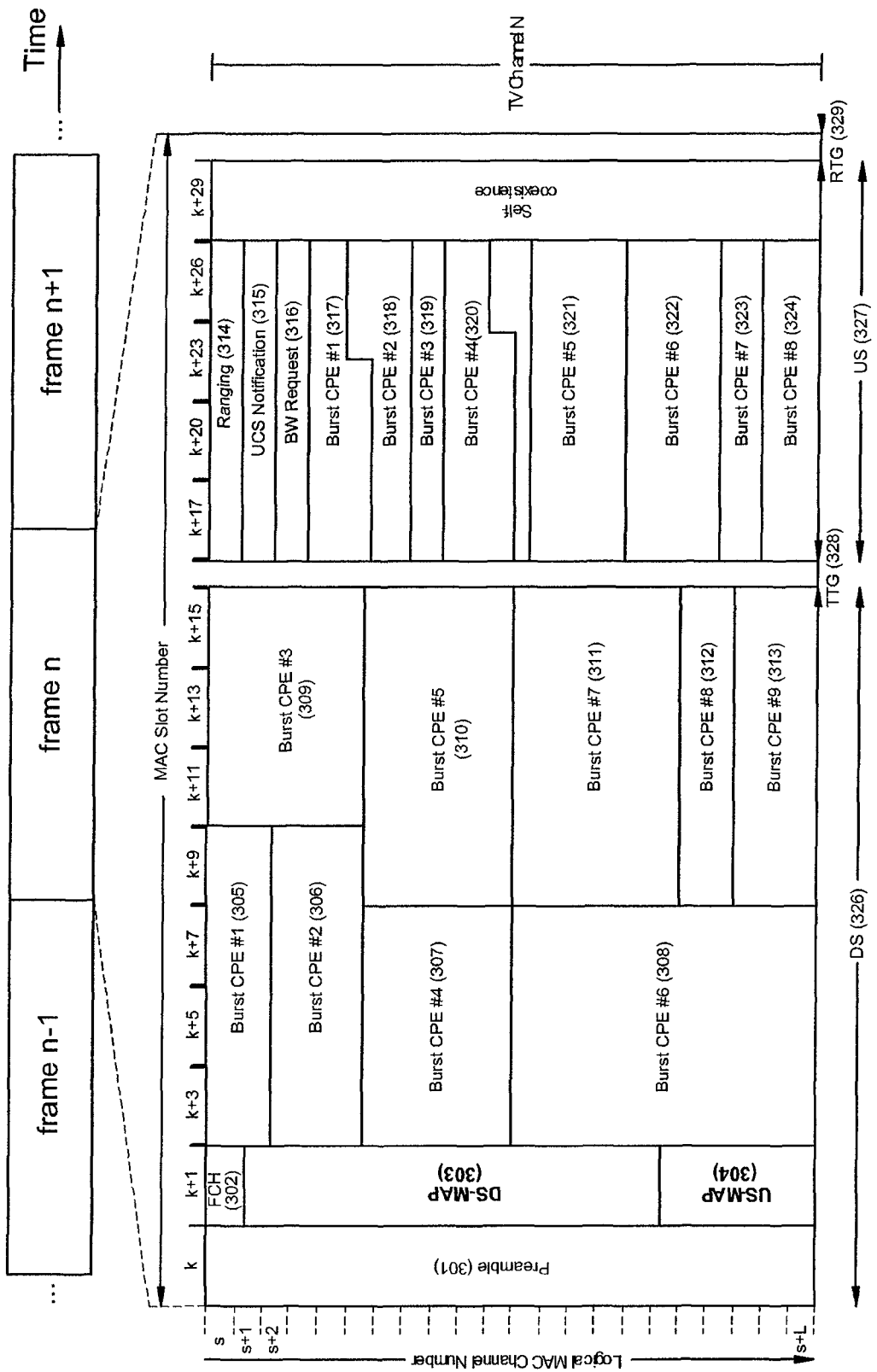
FIG. 3 is a diagram of a frame structure used in a multiple access scheme based on Orthogonal Frequency Division Multiple Access-Time Division Duplexing (OFDMA-TDD).

FIG. 3 is a diagram of a frame structure used in a multiple access scheme based on Orthogonal Frequency Division Multiple Access-Time Division Duplexing (OFDMA-TDD).

Referring to FIG. 3, each of frames n−1, n, and n+1 has a frame structure in which a horizontal axis indicates a time axis and a vertical axis indicates a sub-channel (that is, a frequency axis) of the OFDMA.

By having an empty space, which is referred to as a Transmit/receive Transition Gap (TTG) 328, between an uplink 327 and a downlink 326, each frame is divided into the uplink 327, at the right side, which is transmitted from a terminal to a base station and the downlink 326, at the left side, which is transmitted from the base station to the terminal.

A preamble 301 indicates a period in which the terminal transmits a signal that has a predetermined specific pattern so as to synchronize with the base station.

Here, the synchronized terminal receives a frame header formed of a Frame Control Channel (FCH) 302, a Down Stream MAP (DS-MAP) 303, and an Up Stream MAP (US-MAP) 304.

The FCH 302 includes general information such as lengths of the DS-MAP and US-MAP 303 and 304, a length of a total frame, and lengths of the TTG 328 and a Receive/transmit Transition Gap (RTG) 329, which is necessary to decode the frame.

The DS-MAP 303 includes allocation information about slots 305 through 313 which are respectively allocated to each of a plurality of terminals in the downlink 326, wherein the allocation information about the slots 305 through 313 contains a modulation scheme, coding information, and information about which slot is allocated to which terminal.

The US-MAP 304 includes allocation information about slots 317 through 324 which are respectively allocated to each of a plurality of terminals in the uplink 327, wherein the allocation information about the slots 317 through 324 contains a modulation scheme, coding information, and information about which slot is allocated to which terminal.

That is, the allocation information according to the embodiments of the present invention indicates the plurality of pieces of information included in the DS-MAP and US-MAP 303 and 304.

Figure 6:
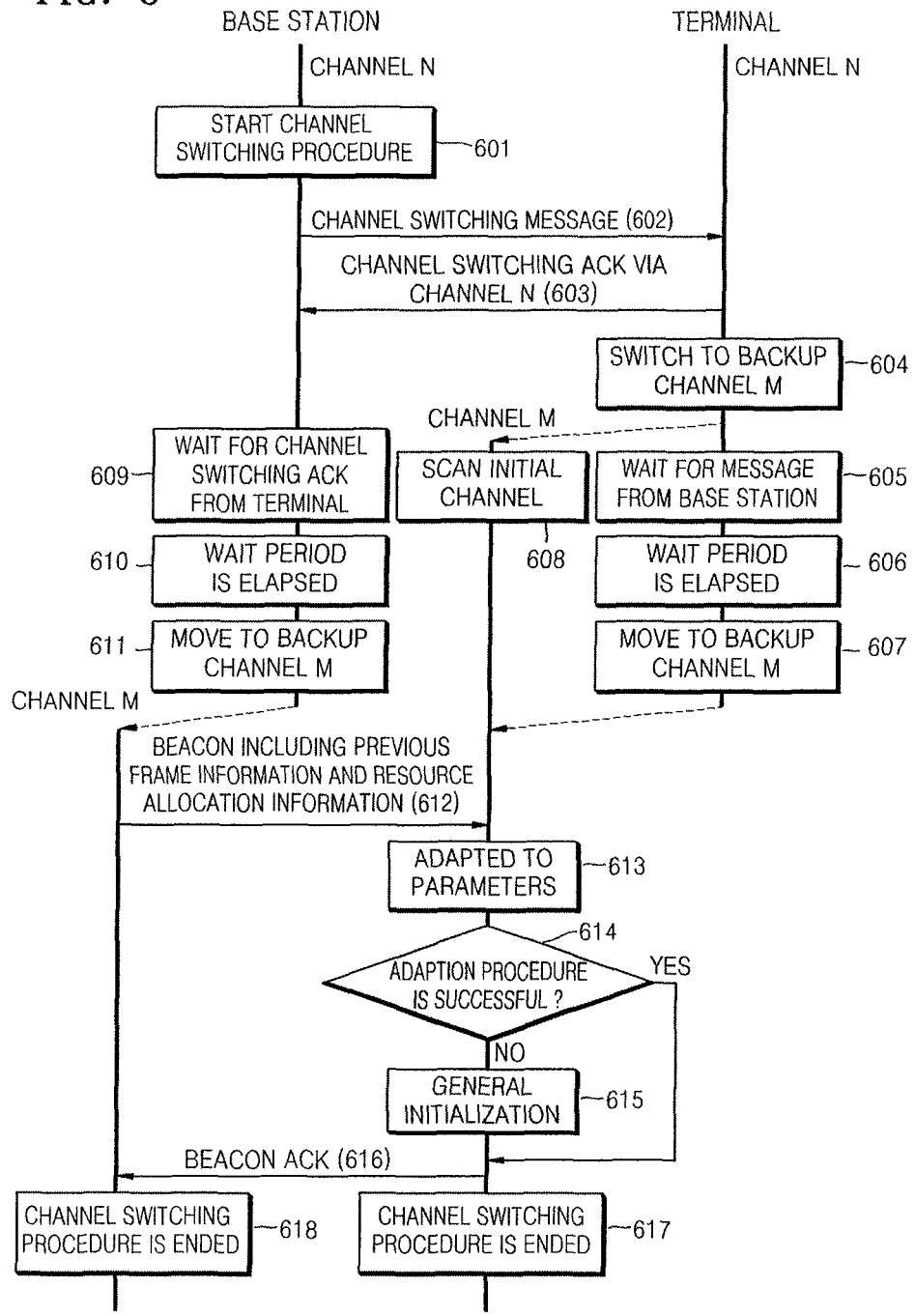
FIG. 6 is a flowchart of a channel switching procedure between a base station and a terminal which are in a cognitive radio system, according to an embodiment of the present invention.

FIG. 6 is a flowchart of a channel switching procedure between a base station and a terminal which are in a cognitive radio system, according to an embodiment of the present invention.

Referring to FIG. 6, the base station and the terminal transmit and receive data by using a channel N that is not used by an incumbent user (IU).

When the base station senses the IU and then, determines that the channel N is no longer in use, channel switching is performed (operation 601).

First, the base station delivers a channel switching message to all of a plurality of terminals under a management range of the base station (operation 602).

Each terminal having received the channel switching message instantly transmits a reception acknowledgment message ACK in response to the channel switching message to the base station via the previous channel N (operation 603), and then immediately switches its communication channel to a predetermined backup channel M (operation 604).

However, some of the terminals may not receive the channel switching message from the base station due to strong interference, such as interference due to the IU.

A terminal, which is incapable of receiving the channel switching message, waits to receive a message from the base station (operation 605), when a predetermined wait period has elapsed (operation 606), the terminal moves to the predetermined backup channel M (operation 607).

Each terminal having received the channel switching message moves to the predetermined backup channel M, scans the predetermined backup channel M (operation 608), and waits for a next message from the base station.

The base station waits for the reception acknowledgment message ACK in response to the channel switching message (operation 609), when a predetermined wait period has elapsed (operation 610), the base station immediately moves to the backup channel M (operation 611), and transmits a beacon frame which includes frame information before channel switching is performed and allocation information about slots in the previous channel N (hereinafter, referred to as 'resource allocation information'), and excludes information about a channel that is switched from N to M (operation 612).

Each terminal receives the beacon frame, and undergoes an adaption procedure that allows each terminal to be adapted to various parameters included in the beacon frame (operation 613).

In the case where each terminal fails in the adaption procedure (operation 614), there may be three main reasons for this. The first is when each terminal loses synchronization with the base station, the second is when each terminal cannot decode Media Access Control (MAC) layer information such as the resource allocation information or the beacon frame although each terminal can synchronize with the base station, and the third is when each terminal cannot detect a signal from the base station.

In the case of the first reason, a terminal, that is, the terminal having lost synchronization waits for a next frame, performs synchronization, and undergoes the adaption procedure according to information about a next beacon frame.

In the case of the second reason, a terminal, that is, the terminal having failed in decoding of the allocation information or the beacon frame performs an initialization work which is the same as that is performed to access a system at the start. This initialization work is referred to as general initialization (operation 615).

In the case of the second reason, a terminal cannot detect the signal when a backup channel is incorrectly set such that a problem is caused with respect to channel management. However, this case is irrelevant to the present invention so that there is no further description.

In the case where each terminal successfully performs the adaption procedure (operation 614), that is, a terminal, which has correctly synchronized with the base station and successfully decoded the resource allocation information or the beacon frame, does not perform the general initialization but immediately transmits a reception acknowledgment message ACK, which indicates normal reception of the beacon frame, by using a slot detected via the resource allocation information of the beacon frame (operation 616). By doing so, the channel switching procedure is ended (operation 617).

By receiving the reception acknowledgment message ACK, which indicates normal reception of the beacon frame, from each terminal, the base also ends the channel switching procedure in regard to each terminal (operation 618).

Figure 7B:
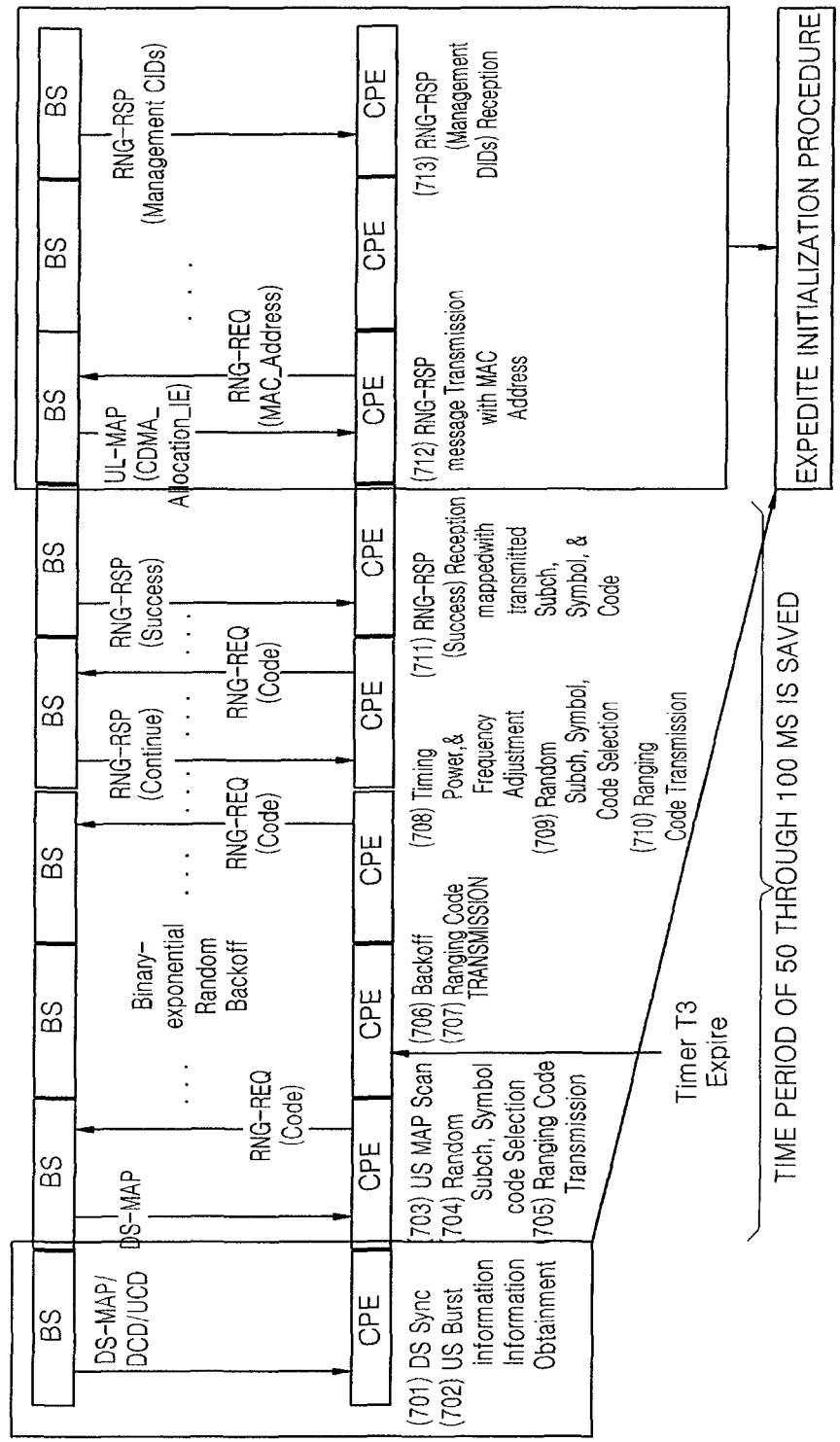

FIGS. 7A and 7B are diagrams of an initialization procedure when a channel switching apparatus and method thereof are applied to an Institute of Electrical and Electronics Engineers (IEEE) 802.22 system according to another embodiment of the present invention.

Referring to FIG. 7A, a terminal in an IEEE 802.22 system according to the related art synchronizes with a base station via a preamble (701), receives a DS-MAP, and thus recognizes synchronization and a structure of a frame in a downlink (702).

The terminal receives a US-MAP so as to detect a position of a ranging slot (or, a random access slot of FIG. 3) that is a slot for an initial access request to the base station so as to transmit initial ranging information indicating an access attempt of the terminal itself (703), and thus periodically transmits an RNG-REG message containing a Code Division Multiple Access (CDMA) code (ranging code) to the base station via the ranging slot (704, 705, 706, 707, 709 and 710.

When the CDMA code is successfully received, the base station periodically transmits a Ranging Response (RNG-RSP) message to the terminal. In this manner, the base station allocates one of downlink slots to the terminal via such a RNG-RSP message transmission. Also, the RNG-RSP message contains the CDMA code received by the base station, and parameters such as power, frequency offset, timing offset, and the like which are of the terminal that has transmitted the CDMA code, thereby allowing the terminal to be adapted to those parameters (708).

The terminal having received the RNG-RSP message acknowledges that transmission of the CDMA code was successful (711).

The base station allocates a temporary slot of an uplink to the terminal by using a CDMA-allocation Information Element (IE).

The terminal transmits, via the allocated temporary slot, a RNG-REQ message containing a MAC address of the terminal itself and requesting a size of a slot that is a resource necessary for transmission of data of the terminal itself (712).

The base station receives the RNG-REQ message containing the MAC address of the terminal, allocates an uplink slot to the terminal according to a current resource allocation status, allocates a Connection Identification (CID) to the terminal so as to allow the terminal to transmit the data to the base station via the slot, and thus transmits a RNG-RSP message with the CID to the terminal (713).

However, as illustrated in FIG. 7B, in the case where the channel switching apparatus and method thereof according to the embodiment of the present invention are applied to an IEEE 802.22 system, when a beacon frame including allocation information of a previous channel is re-transmitted without a change, procedures (703 through 711) covering transmission of an initial CDMA code through reception of a RNG-REQ message with a MAC address may be skipped since uplink and downlink slots are already set to be equal to those of the previous channel. In this manner, by skipping the procedures (703 through 711) according to the channel switching apparatus and method thereof, a time period of 50 through 100 ms may be saved.

Such expedite initialization is achieved provided that a position of the terminal is not changed after performing channel switching. Thus, the channel switching apparatus and method thereof according to an embodiment of the present invention may be applied to a terminal such as used in the IEEE 802.22 system, the position of which is fixed, or to a terminal in a nomadic environment.

In addition, when initialization via the expedite initialization fails, the procedures described with reference to FIG. 7A are to be performed.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. The computer readable recording medium can also be distributed over network coupled computer systems so that the computer readable code is stored and executed in a distributed fashion. Also, a font ROM structure according to the embodiment of the invention can be embodied as computer readable codes on a computer readable recording medium such as ROM, RAM, CD-ROMs, magnetic tapes, floppy disks, optical data storage devices, etc.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A channel switching apparatus of a base station in a cognitive radio system, wherein the base station allocates a slot for data exchange with each of a plurality of terminals in a frequency channel which is not used by an IU (incumbent user), and performs communication, the base station comprising:
   a channel switching message transmitting unit transmitting a channel switching message requesting to switch to a backup channel when a signal of the IU is sensed in the frequency channel;
   a backup channel beacon transmitting unit transmitting a beacon frame via the backup channel, wherein the beacon frame comprises allocation information about slots which are in a previous channel and which are respectively allocated to each of the plurality of terminals, wherein the allocation information contains at least one of a modulation scheme, coding information and information about which slot is allocated to which terminal; and
   a backup channel communicating unit allocating the slot for data exchange with each of the plurality of terminals to the backup channel according to the allocation information, and communicating with each of the plurality of terminals via the backup channel.

2. The channel switching apparatus of claim 1, further comprising a reception acknowledgement message receiving unit receiving a reception acknowledgement message from each of the plurality of terminals, wherein the reception acknowledgement message indicates that the channel switching message is normally received.

3. The channel switching apparatus of claim 2, wherein the backup channel beacon transmitting unit transmits the beacon frame via the backup channel when the reception acknowledgement message is received or when the reception acknowledgement message is not received during a predetermined wait period.

4. The channel switching apparatus of claim 1, wherein the beacon frame further comprises frame information about a data frame exchanged via the frequency channel, and
   the backup channel communicating unit communicating with each of the plurality of terminals via the backup channel by using the frame information.

5. The channel switching apparatus of claim 4, wherein the frame information about the data frame contains at least one of a start position, an end position, a length of a header, a modulation scheme of the header, a channel coding scheme of the header, a coding rate of the header, a repeat count of the header, a length of a data field, a modulation scheme of the data field, a channel coding scheme of the data field, and a coding rate of the data field.

6. A channel switching method performed by a base station in a cognitive radio system, wherein the base station allocates a slot for data exchange with each of a plurality of terminals in a frequency channel which is not used by an IU (incumbent user), and performs communication, the channel switching method comprising:
  transmitting a channel switching message for requesting to switch to a backup channel when a signal of the IU is sensed in the frequency channel;
  transmitting a beacon frame via the backup channel, wherein the beacon frame comprises allocation information about slots which are in a previous frequency channel and which are respectively allocated to each of the plurality of terminals, wherein the allocation information contains at least one of a modulation scheme, coding information and information about which slot is allocated to which terminal; and
  allocating the slot for data exchange with each of the plurality of terminals to the backup channel according to the allocation information, and communicating with each of the plurality of terminals via the backup channel.

7. The channel switching method of claim 6, further comprising receiving a reception acknowledgement message from each of the plurality of terminals, wherein the reception acknowledgement message indicates that the channel switching message is normally received.

8. The channel switching method of claim 7, wherein the transmitting of the beacon frame comprises transmitting the beacon frame via the backup channel when the reception acknowledgement message is received or when the reception acknowledgement message is not received during a predetermined wait period.

9. The channel switching method of claim 6, wherein the beacon frame further comprises frame information about a data frame exchanged via the frequency channel, and
  the communicating comprises communicating with each of the plurality of terminals via the backup channel by using the frame information.

10. The channel switching method of claim 9, wherein the frame information about the data frame contains at least one of a start position, an end position, a length of a header, a modulation scheme of the header, a channel coding scheme of the header, a coding rate of the header, a repeat count of the header, a length of a data field, a modulation scheme of the data field, a channel coding scheme of the data field, and a coding rate of the data field.

11. A channel switching apparatus of a terminal in a cognitive radio system, wherein the terminal communicates with a base station via an allocated slot in a frequency channel which is not used by an IU (incumbent user), the channel switching apparatus comprising:
  a beacon frame receiving unit receiving a beacon frame via a backup channel, wherein the beacon frame comprises allocation information about the slot which is in a previous frequency channel and which is allocated to the terminal, when the beacon frame receiving unit recognizes that the frequency channel is unusable due to the IU, wherein the allocation information contains at least one of a modulation scheme, coding information and information about which slot is allocated to which terminal;
  an allocated slot detecting unit extracting the allocation information by decoding the beacon frame, and detecting the slot in the backup channel by using the extracted allocation information, wherein the slot is allocated to the terminal; and
  a backup channel communicating unit communicating with the base station via the detected slot.

12. The channel switching apparatus of claim 11, wherein the beacon frame receiving unit recognizes that the frequency channel is unusable due to the IU when a channel switching message requesting to switch to the backup channel is received from the base station or when a message transmitted from the base station is not received during a predetermined wait period.

13. The channel switching apparatus of claim 11, further comprising a channel switching reception acknowledgement message transmitting unit which transmits a reception acknowledgement message indicating normal reception of the channel switching message when the channel switching message requesting to switch to the backup channel is received from the base station.

14. The channel switching apparatus of claim 11, wherein the allocated slot detecting unit performs synchronization and ranging via message exchange with the base station and thus, allocates the slot in the backup channel when the decoding of the beacon frame fails.

15. The channel switching apparatus of claim 11, wherein the allocated slot detecting unit further comprises a beacon reception acknowledgement message transmitting unit which transmits a reception acknowledgement message indicating that the decoding of the beacon frame is successful to the base station.

16. The channel switching apparatus of claim 11, wherein the beacon frame further comprises frame information about a data frame exchanged via the frequency channel, and
  the backup channel communicating unit communicating with the base station via the detected slot by using the frame information.

17. The channel switching apparatus of claim 16, wherein the frame information about the data frame contains at least one of a start position, an end position, a length of a header, a modulation scheme of the header, a channel coding scheme of the header, a coding rate of the header, a repeat count of the header, a length of a data field, a modulation scheme of the data field, a channel coding scheme of the data field, and a coding rate of the data field.

18. A channel switching method performed by a terminal in a cognitive radio system, wherein the terminal communicates with a base station via an allocated slot in a frequency channel which is not used by an IU (incumbent user), the channel switching method comprising:
  receiving a beacon frame via a backup channel, wherein the beacon frame comprises allocation information about the slot which is in a previous frequency channel and which is allocated to the terminal, when the beacon frame receiving unit recognizes that the frequency channel is unusable due to the IU, wherein the allocation information contains at least one of a modulation scheme, coding information and information about which slot is allocated to which terminal;
  extracting the allocation information by decoding the beacon frame, and detecting the slot in the backup channel by using the extracted allocation information, wherein the slot is allocated to the terminal; and
  communicating with the base station via the detected slot.

19. The channel switching method of claim 18, wherein the receiving of the beacon frame comprises recognizing that the frequency channel is unusable due to the IU when a channel switching message requesting to switch to the backup channel is received from the base station or when a message transmitted from the base station is not received during a predetermined wait period.

20. The channel switching method of claim 18, further comprising transmitting a reception acknowledgement message indicating normal reception of the channel switching message when the channel switching message requesting to switch to the backup channel is received from the base station.

21. The channel switching method of claim 18, wherein the extracting comprises performing synchronization and ranging via message exchange with the base station and thus, allocating the slot in the backup channel when the decoding of the beacon frame fails.

22. The channel switching method of claim 18, wherein the extracting further comprises transmitting a reception acknowledgement message indicating that the decoding of the beacon frame is successful to the base station.

23. The channel switching method of claim 18, wherein the beacon frame further comprises frame information about a data frame exchanged via the frequency channel, and the communicating comprises communicating with the base station via the detected slot by using the frame information.

24. The channel switching method of claim 23, wherein the frame information about the data frame contains at least one of a start position, an end position, a length of a header, a modulation scheme of the header, a channel coding scheme of the header, a coding rate of the header, a repeat count of the header, a length of a data field, a modulation scheme of the data field, a channel coding scheme of the data field, and a coding rate of the data field.

* * * * *